United States Patent
Driesen et al.

(10) Patent No.: US 7,523,142 B2
(45) Date of Patent: Apr. 21, 2009

(54) SYSTEMS, METHODS AND ARTICLES OF MANUFACTURE FOR UPGRADING A DATABASE WITH A SHADOW SYSTEM

(75) Inventors: Volker Driesen, Sandhausen (DE); Christiane Valentin, Walldorf (DE)

(73) Assignee: SAP AG, Walldorf (DE)

( * ) Notice: Subject to any disclaimer, the term of this patent is extended or adjusted under 35 U.S.C. 154(b) by 1023 days.

(21) Appl. No.: 10/320,487

(22) Filed: Dec. 17, 2002

(65) Prior Publication Data

US 2003/0130985 A1 Jul. 10, 2003

Related U.S. Application Data

(60) Provisional application No. 60/339,806, filed on Dec. 17, 2001.

(51) Int. Cl.
G06F 17/30 (2006.01)
G06F 7/00 (2006.01)
(52) U.S. Cl. ...................... 707/202; 707/204
(58) Field of Classification Search ........... 707/202, 707/204
See application file for complete search history.

(56) References Cited

U.S. PATENT DOCUMENTS

| | | | | |
|---|---|---|---|---|
| 5,625,815 | A | 4/1997 | Maier et al. | 395/600 |
| 6,981,003 | B2 * | 12/2005 | Pauliks et al. | 707/200 |
| 2002/0174358 | A1 * | 11/2002 | Wolff et al. | 713/200 |
| 2003/0126133 | A1 * | 7/2003 | Dattatri et al. | 707/10 |

FOREIGN PATENT DOCUMENTS

| | | |
|---|---|---|
| WO | WO 99/08206 | 2/1999 |
| WO | WO 99/39266 | 8/1999 |

OTHER PUBLICATIONS

Oracle8i Data Guard, Concepts, Administration, and Installation Guide, Release 3.0, Oct. 2001.*
Oracle8i Data Guard, Concepts, Administration, and Installation Guide, Release 3.0, Oct. 2001.*
Oracle7™ Server Concepts, Release 7.3, Feb. 1996, Oracle®.*
Oracle8i Data Guard, Concepts, Administration, and Installation Guide, Release 3.0, Oct. 2001.*
Oracle7™ Server Concepts, Release 7.3, Feb. 1996, Oracle®.*

(Continued)

Primary Examiner—Kuen S Lu
(74) Attorney, Agent, or Firm—Finnegan, Henderson, Farabow, Garrett & Dunner, LLP

(57) ABSTRACT

Methods, systems, and articles of manufacture are disclosed for upgrading a database using of a shadow system. During an upgrade, the shadow system or repository is built as a new instance on the database. The shadow system may be a complete central instance and comprise the new release to be installed in the database. The new release or "destination release" may represent the release(s) of software application(s) and/or data that the user wants to run in the future. The destination release may replace a "source release" of software application(s) and/or data currently running on the database as part of a main productive system. In one embodiment, the shadow system may be operated in parallel with the main productive system to minimize the required downtime for the upgrade.

24 Claims, 12 Drawing Sheets

OTHER PUBLICATIONS

Oracle9i Database Administrator's Guide, Release 2 (9.2) Mar. 2002, Oracle®.*

J. Wang et al., "A Technique For Upgrading Database Machines Online," Advances In Information Systems, First International Conference, 2000 Proceedings, Lecture Notes in Computer Science, LNCS, vol. 1909, Springer-Verlag, Berlin, Germany, pp. 82-91 (2000).

"SAP® Solution Management Integrates SAP Offerings to Reduce TCO and Expedite Customer ROI," SAP Press Release, Sapphire® '02 Conference, Lisbon, Portugal, 3 pages (Sep. 4, 2002).

Hamm, Roland, "Release Upgrade With Acceptable Downtime," presentation at SAP "Teched" fair, Vienna, Austria, 27 pages (Nov. 2001).

"The Release and Maintenance Strategy of mySAP.com® Components," SAP AG, Walldorf Germany, 68 pages (2002).

SAP White Paper, "The Release Strategy of mySAP.com® Components," SAP AG, Walldorf Germany, 64 pages (2001).

* cited by examiner

SYSTEMS, METHODS AND ARTICLES OF MANUFACTURE FOR UPGRADING A DATABASE WITH A SHADOW SYSTEM

CROSS-REFERENCE TO RELATED APPLICATION

This application is related to and claims the benefit of priority under 35 U.S.C. 119(e) to U.S. Provisional Patent Application No. 60/339,806, filed on Dec. 17, 2001, the disclosure of which is expressly incorporated herein by reference in its entirety.

BACKGROUND OF THE INVENTION

I. Field of the Invention

The present invention generally relates to databases, including databases associated with computing-based environments. More particularly, the invention relates to systems, methods and articles of manufacture for upgrading a database with a shadow system to install, for example, a new release of one or more software applications running on the database.

II. Background and Material Information

Databases are often provided to facilitate the running of software applications in a computing-based environment. Examples of software applications include operating system software, and programs that run on an operating system. Databases in computing environments also store data. Such data may include data to configure programs, as well as application data that is generated during, for example, productive use or operation of an application.

Various arrangements may be provided to facilitate access to a database. For example, networked and other database sharing environments permit multiple users to share a database. Such arrangements facilitate client-server solutions for business and other types of database user environments. By way of example, R/3 is a client-server solution provided by SAP® AG. An R/3 system typically includes a number of software applications or modules that are installed in an environment comprising a database and an application server connected to the database. The application server of an R/3 system can perform numerous functions, including executing programs stored in the database.

From time to time, a database may need to be upgraded in view of various factors. For instance, modifications or enhancements to applications and/or data by a software vendor may require that prior releases running on a database be upgraded to a new release. Additionally, revisions to correct programming errors or bugs may require that a database be upgraded with a new release.

When upgrading a database, there are a number of technical problems to be addressed. For example, most database users depend on the availability of a database, including the applications and data stored therein. In some cases, the required availability of a database may dictate that interruptions to productive operation be minimized when performing an upgrade. By way of example, a database user may require approximately, continuous availability of a database (e.g., availability 12-24 hours a day, 5-7 days a week). Therefore, extended database interruptions may be unacceptable and minimizing the downtime for a database upgrade can become problematic, especially when attempting to upgrade a large database using conventional techniques.

Other issues may exist when upgrading a database. For instance, many database environments require that certain modifications, add-ons, support packages, application data, customizing data and/or other items be maintained when installing a new release. Making adjustments to import or maintain such items can dramatically extend the downtime required for performing an upgrade and, in some cases, create failure or disaster risks for the database. Conventional methods for upgrading a database also suffer other drawbacks, such as being technology dependent or restrictive as to the upgrade release (i.e., dependent on the prior release(s) installed in the database).

Therefore, there is a need for improved systems, methods and articles of manufacture for upgrading a database. For example, in view of the drawbacks of conventional approaches, there is a need for an improved database upgrade methodology that requires only minimal downtime. There is also a need for systems, methods and articles of manufacture to upgrade a database with less restrictive technology and/or release dependencies. There is also a need to provide other improvements, such as the ability to efficiently handle modifications, add-ons, support modules, application data, customizing data and/or other items when performing a database upgrade.

SUMMARY OF THE INVENTION

Consistent with embodiments of the present invention, systems, methods and articles of manufacture are provided for upgrading a database. Embodiments of the invention include systems and methods that are adapted to upgrade a database with minimal or reduced downtime. Embodiments of the invention also include systems and methods for updating a database with minimal technology and/or release dependencies. Certain embodiments of the invention also provide other advantages, such as improved abilities to handle modifications, add-ons, support modules or packages, application data, customizing data and/or other items as part of a database upgrade.

In accordance with an embodiment of the invention, systems, methods and articles of manufacture are provided for upgrading a database by using a shadow system or repository. During an upgrade, the shadow system is built as a new instance on the database. The shadow system may be a complete central instance and comprise the new release to be installed in the database. The new release or "destination release" represents the release(s) of software application(s) and/or data that the user wants to run in the future. The destination release may replace a "source release" or previously installed version of software and/or data that is currently running on the database.

According to one embodiment of the present invention, a method is provided for upgrading a database, the database including a main system with a source release accessible to a main db user. The method may include: installing a shadow system in the database, the shadow system including a destination release accessible to a shadow db user; setting triggers on storage structures for the source release to report changes to the source release by the main db user; operating the shadow system in parallel with operation of the main system; updating the shadow system based on trigger reports indicating a change to the source release; and performing, during downtime of the main system, a system switch to remove the source release from the database and provide an upgraded system based on the destination release of the shadow system.

In the exemplary method, the step of installing the shadow system may include defining storage structures for the destination release based on a name of the main db user. Further, the step of installing the shadow system may include importing at least one software application of the destination release into the defined storage structures.

In accordance with another embodiment of the invention, a system is provided for upgrading a database, the database including a source release that accessible to a main db user. Consistent with the principles of the invention, the system may comprise: means for installing a shadow repository in the database, the shadow repository including a destination release accessible to a shadow db user; means for reporting changes to entries of storage structures for the source release by the main db user; a shadow application server for providing access to the shadow repository by the shadow db user, and a main application server for providing access to the source release by the main db user, wherein the shadow application server and main application server may be operated in parallel; means for updating the shadow repository based on reported changes to entries of the storage structures for the source release; and means for performing, during downtime of the main application server, a system switch to replace the source release in the database with the destination release of the shadow repository, whereby the destination release is thereafter accessible to the main db user.

Optionally, the storage structures for the shadow repository comprise tables, such as repository tables, customizing tables and/or application tables. Additionally, in one embodiment, the means for reporting changes comprises means for setting triggers on the customizing tables to report any changes to entries of the customizing tables by the main db user. Moreover, the system may comprise means for creating synonyms for the shadow db user to provide access to storage structures of the shadow repository that are stored under the name of the main db user.

Other features and aspects may also be provided in the exemplary system. For instance, the means for updating the shadow repository may comprise means for analyzing trigger reports for the customizing tables and updating corresponding entries of customizing tables for the shadow repository based on a priority scheme. Also, the system may further comprise means for configuring the shadow repository installed in the database during runtime access to the source release by the main db user, wherein the means for configuring the shadow repository comprises means for adjusting entries of storage structures for the destination release based on at least one of user modifications, configurations and additional software.

In accordance with yet another embodiment of the invention, a computer-readable medium is provided that stores program instructions executable by a computing-based environment to perform a method for upgrading a database. The database may include a main system with a source release accessible to a main db user. Further, the method may comprise: installing a shadow system in the database, the shadow system including a destination release accessible to a shadow db user; setting triggers on storage structures for the source release to report changes to the source release by the main db user; operating the shadow system in parallel with operation of the main system; updating the shadow system based on trigger reports indicating a change to the source release; and performing, during downtime of the main system, a system switch to replace the source release in the database with the destination release of the shadow system, whereby the destination release is thereafter accessible to the main db user.

According to another embodiment of the invention, a method is provided for upgrading a database, the database including a main system with a source release accessible to a main db user. As further disclosed herein, the method may comprise: installing in the database a shadow system that includes a destination release accessible to a shadow db user, wherein installing the shadow system comprises defining storage structures for the destination release based on a name of the main db user, and creating synonyms for the shadow db user to provide access to storage structures for the destination release that are stored under the name of the main db user; operating the shadow system in parallel with operation of the main system; and performing, during downtime of the main system, a system switch to remove the source release from the database and provide an upgraded system based on the destination release of the shadow system.

In the exemplary method, installing the shadow system may further comprise importing at least one of a software application and data of the destination release into the defined storage structures. Further, defining the storage structures may include adding a predetermined suffix to a defined name of each storage structure in the shadow system.

It is to be understood that both the foregoing general description and the following detailed description are exemplary and explanatory only, and should not be considered restrictive of the scope of the invention, as described. Further, features and/or variations may be provided in addition to those set forth herein. For example, embodiments of the invention may be directed to various combinations and subcombinations of the features described in the detailed description.

BRIEF DESCRIPTION OF THE DRAWINGS

The accompanying drawings, which are incorporated in and constitute a part of this specification, illustrate various embodiments and aspects of the present invention. In the drawings.

DETAILED DESCRIPTION

Embodiments of the present invention are directed to systems, methods and articles of manufacture for upgrading a database (abbreviated as "db" or "DB"). Such embodiments may be implemented in various environments, such as computing-based environments with one or more database users. The designation "database user" may refer to a db user, db schema or db, depending on the database used. In one embodiment of the invention, a database upgrade is performed in a computing-based environment that includes an application server connected to a database and at least one database user. Such environments may be provided for facilitating, for example, client-server solutions. In another embodiment of the invention, a database upgrade is performed to upgrade a database associated with a workstation, personal computer, laptop or other computing device. The present invention, however, is not limited to such examples, and embodiments of the invention may be implemented for other platforms as well as computing-based environments.

In accordance with an embodiment of the invention, the upgrade of a database may be performed to install, for example, a new release of one or more applications stored in the database. A new release of a software application may include modifications, enhancements and/or other changes to a prior release of the application. Additionally, or alternatively, embodiments of the invention may be implemented to upgrade a database with new data. For instance, new data may be provided that comprises a new release or set of data for configuring programs executed on the database. Such data may be customized by or for a database user or customer. In one embodiment, the upgrade of a database is performed to install a new release of at least one application and/or data associated with the application.

Figure 1:
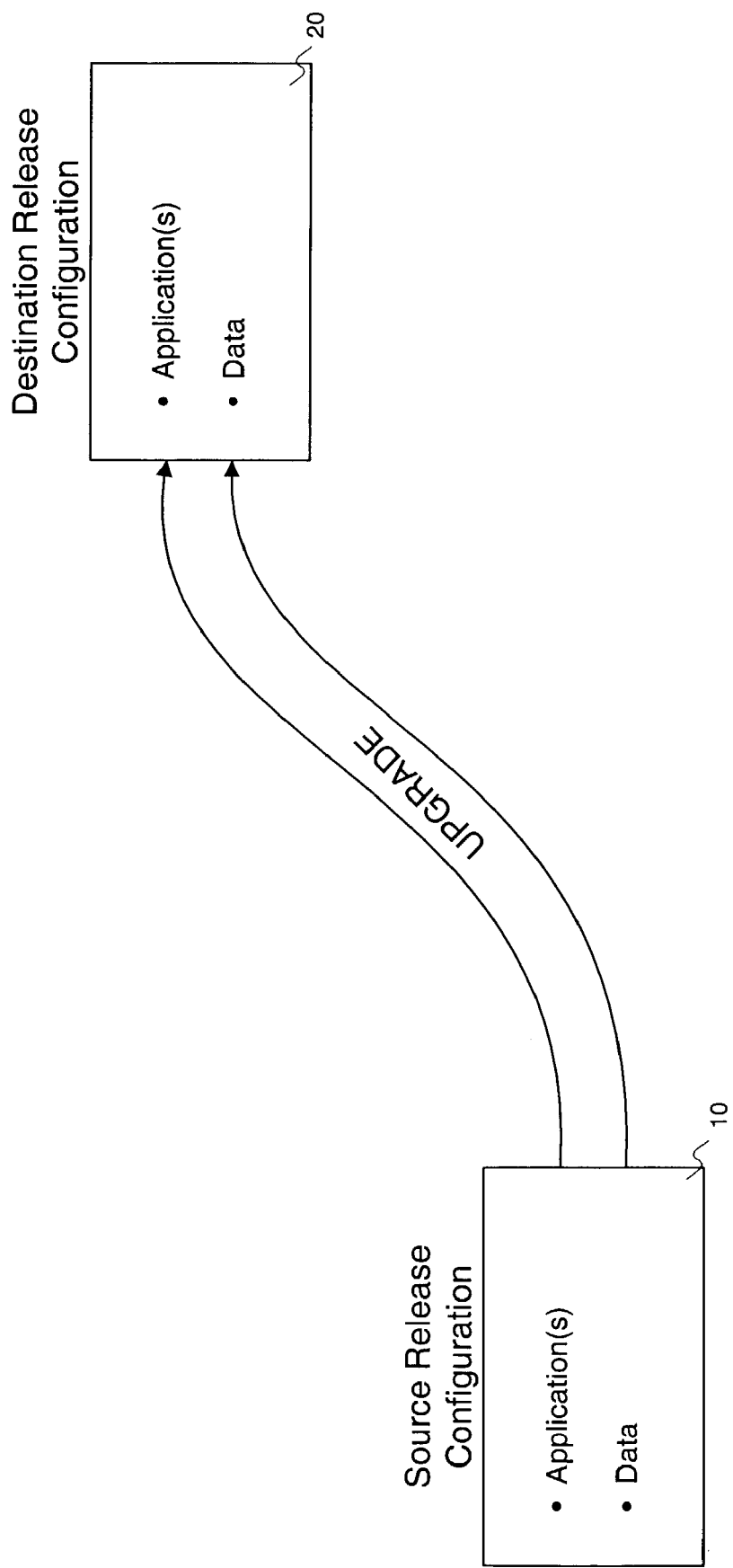
FIG. 1 is a conceptual diagram of an exemplary upgrade of a database from a source release configuration to a destination release configuration, consistent with embodiments of the present invention.

To illustrate the principles of the invention, FIG. 1 is a conceptual diagram of an exemplary upgrade of a database. As shown in FIG. 1, an upgrade may be performed to replace a source release configuration 10 installed in a database. The term "source release" as used herein refers to one or more releases or versions of application(s) and/or data stored in the database. Such applications may comprise operating system software, as well as applications that run on the operating system. In addition, data of source release configuration 10 may comprise, for example, data to configure one or more applications of the source release. Such data may be provided by a software vendor and/or customized by a user.

By performing an upgrade on the database, the source release is replaced with new release(s) of application(s) and/or data. As a result, a destination release configuration 20 is installed in the database for future use by the database user. The "destination release" may include new release(s) of one or more applications prepared by, for example, a software vendor or other entity. The destination release may also include new release(s) of data, such as data for configuring an application during productive operation. Additionally, or alternatively, modifications, add-ons, support modules, application data, customizing data and/or other items included in the source release configuration may be imported or converted for use in the destination release configuration.

As will be appreciated by those skilled in the art, various storage structures, techniques and arrangements may be utilized for storing applications and data. For instance, software applications and data may be structured into indexes or tables. Database tables are commonly known to those skilled in the art and are utilized as a storage structure in, for example, relational database environments. Examples of commercially available databases include SAP® DB, IBM® Universal DB2 and iSeries, Informix® Dynamic Server, Microsoft® SQL Server and Oracle® 9iDatabase. As commonly known, data definition language (DDL) statements can be used for creating and modifying database tables or indexes. To access data in a database, a conventional programming language, such as structured query language (SQL), can also be employed. Moreover, the database may be implemented in various ways, such as a central or distributed database architecture. It will be appreciated that other storage structures, techniques and arrangements may be utilized to implement the invention and, therefore, embodiments of the invention are not limited to the examples mentioned above.

In order to minimize or reduce the downtime associated with an upgrade, a shadow system may be built as a new instance on the database. Consistent with embodiments of the invention, the shadow system may be implemented as a complete central instance and comprise the destination release to be installed in the database. Accordingly, the destination release may be technology or release independent to provide database upgrade flexibility. As indicated above, the destination release represents the new release(s) of software application(s) and/or data that the user wants to run in the future. The destination release may replace the source release configuration running on the database and representing a current or main production system. As further disclosed herein, the production system and shadow system may be operated in parallel to permit, for example, certain upgrade actions and adjustments to be performed before downtime. The use of parallel systems permit, for instance, the running of the shadow system to perform data conversion and the integration of modifications, add-ons and/or other items while at the same time minimizing or reducing the overall downtime required for the upgrade.

Figure 2:
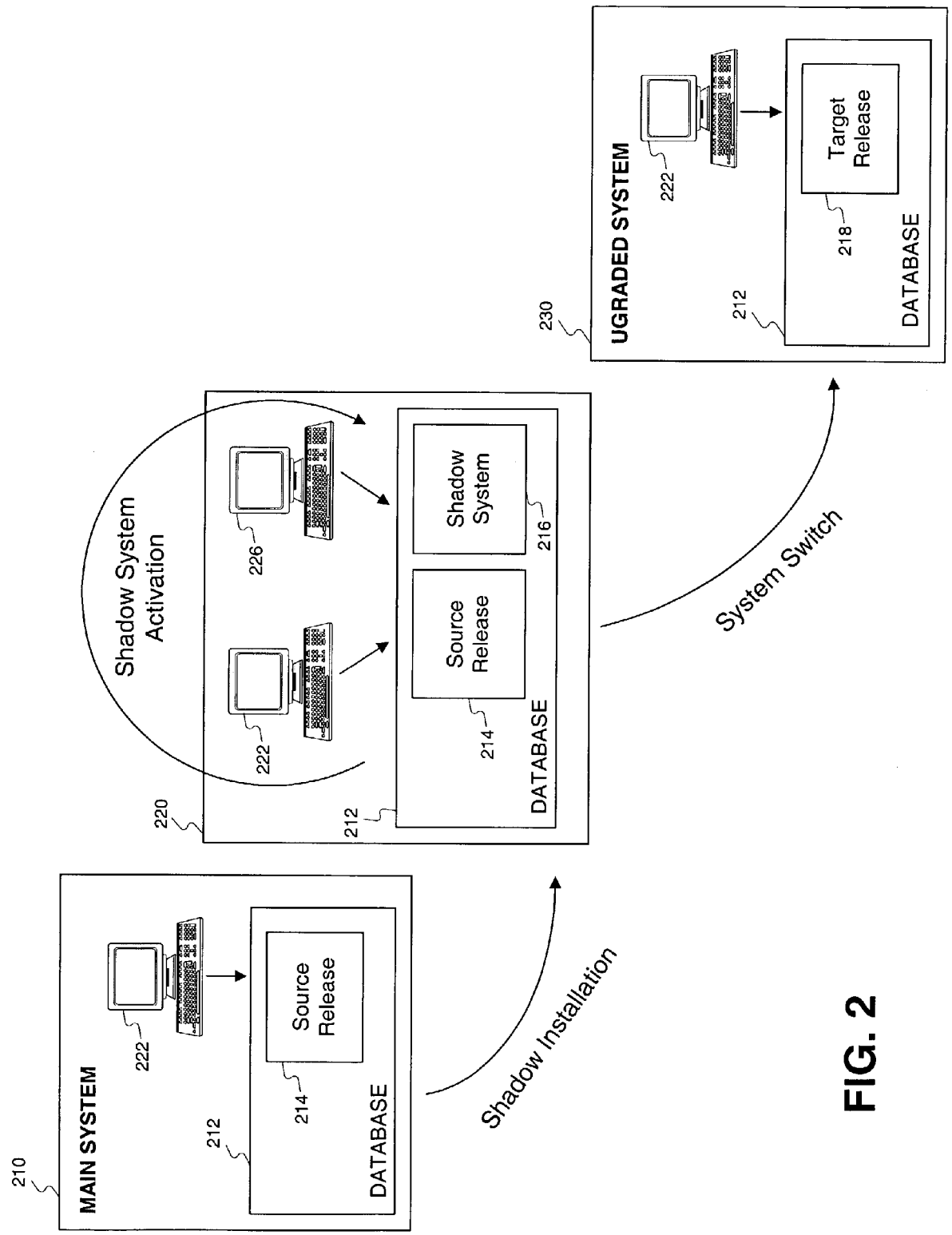
FIG. 2 is a block diagram of an exemplary upgrade using a shadow system, consistent with embodiments of the present invention.

To further illustrate embodiments of the present invention, FIG. 2 is a block diagram of an exemplary upgrade using a shadow system or repository. As shown in FIG. 2, a current or main productive system 210 may comprise a source release 214 that is running on database 212. A main db user 222 may access the source release on database 212 through, for example, an application server. To upgrade source release 214 to a destination or target release 218, a shadow system 216 may be installed with the destination release on database 212. The shadow system may comprise all software and/or data of the destination release and may be utilized to import or convert any modifications, add-ons, application data and/or other items that are associated with the source release.

During shadow system activation, a shadow system db user 226 may access shadow system 216 on database 212 to perform upgrade actions and adjustments before downtime of the main production system. Parallel operation by the main db user 222 and shadow db user 226 may be supported by running different application servers-one server for the main system and another server for the shadow system. These application servers may be implemented logically on one device or machine using, for example, different ports. Alternatively, the servers can be created using two different machines, as further disclosed herein. As a result, certain upgrade actions can be performed while not interrupting access to source release 214 by main db user 222.

After installing and operating the shadow system, a system switch is performed as part of a downtime phase. During downtime, any remaining data or updates are imported to shadow system 216 and, subsequently, source release 214 is removed from database 212. Further, to complete the system switch, the applications and data associated with shadow system are renamed to thereby provide an upgraded system 230 with destination or target release 218. The renaming of the shadow system may include, for example, the renaming of storage structures (such as database tables or indexes) to names identical or substantially similar to those used by the source release 214. Such a renaming procedure facilitates, for example, access to target release 218 by main db user 222.

While implementing the upgrade procedure of FIG. 2 may require extra system resources to support, for example, the parallel operation of the main productive instance and shadow instance, the use of a shadow system or repository reduces downtime and is particularly useful for database environments that can not tolerate extended database interruptions. As a result, certain upgrade actions can be performed before downtime and the parallel operation of the shadow repository facilitates activation, testing and/or distribution before the final system switch.

Figure 3:
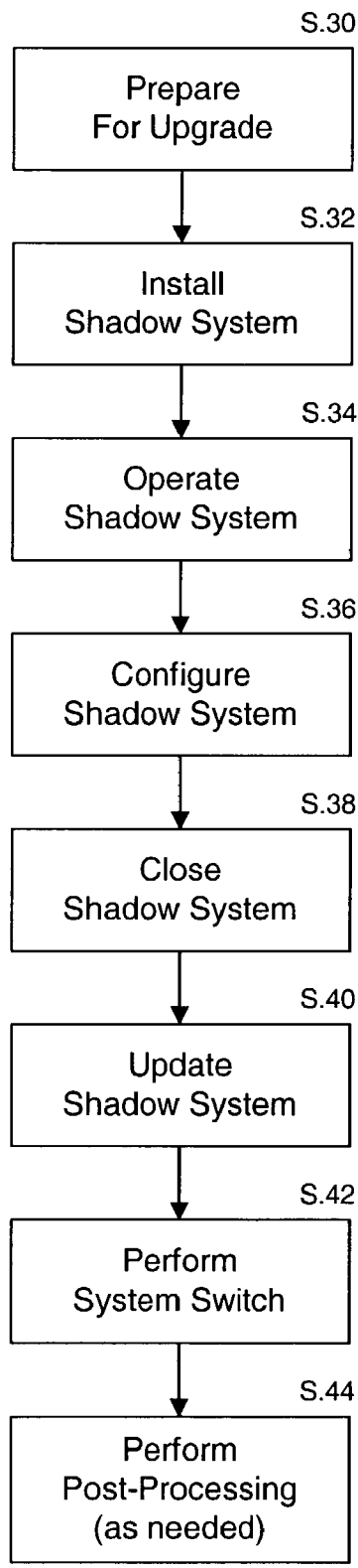
FIG. 3 is a flowchart of an exemplary method for performing a database upgrade, consistent with embodiments of the present invention

FIG. 3 is a flowchart of an exemplary method for upgrading a database, consistent with embodiments of the invention. Initially, preparations are made before performing the upgrade (step S.30). To prepare for an upgrade, a system check may be performed to confirm that any hardware and/or software requirements for the upgrade are satisfied by the database environment. For instance, depending on the nature of the upgrade, certain processing or database requirements may exist. In addition, software requirements may exist that require, for example, the installation of specific editions or releases of operating system software and/or other applications. Such hardware and software requirements may be published or provided by a software vendor and/or some or all the requirements may be determined by a system administrator.

In one embodiment, preparation for an upgrade comprises estimating the required downtime and scheduling the upgrade during a particular time period (e.g., such as in the evening or over the weekend) to minimize interruptions to database user(s) who access the database. In another embodiment, preparation for the upgrade comprises selecting an upgrade strategy depending on various factors, such as available resources. For instance, if all hardware and software requirements are satisfied, a downtime-minimized strategy may be selected to perform the upgrade with parallel operation of the production system and the shadow system. Alternatively, if sufficient resources do not exist to support the parallel operation of the shadow instance, then a resource-minimized strategy may be employed to perform the upgrade of the database without parallel operation of the systems. With the resource-minimized strategy, the downtime may be longer since the shadow system can not be operated in parallel with the production system. None the less, such a strategy may be tolerable or necessary for certain database environments.

Referring again to FIG. 3, the shadow system is installed in the database environment (step S.32). As part of this step, storage structures need to be defined for the shadow system. By way of example, assume database tables or indexes are used in the database. In such a case, DDL statements may be utilized for creating the database tables or indexes for the shadow system. The tables may be defined, for example, as transparent tables with any name and number of indexes. Embodiments of the invention, however, are not limited to table structures or the use of DDL statements and, as will be appreciated by those skilled in the art, other conventional techniques may be utilized for creating the shadow system.

In one embodiment, naming conventions for the shadow system are similar to that used for the tables or indexes related to the source release of the main production system. This approach facilitates the final system switch and subsequent access by the main db user. However, to avoid conflicts and permit parallel operation, each database user is required to have its own namespace. Thus, while two db users may have tables with the same name, each table or index is qualified by specifying, for example: "database user name"."table name" or "database user name"."index name." In accordance with an embodiment of the invention, the shadow tables or indexes may be created under the main db user name but with different table names. For example, a suffix or prefix (such as "~") may be added to the corresponding table name or index in the main system to define the tables or indexes in the shadow system.

Further, synonyms may be utilized to permit parallel operation and access by a shadow db user to the shadow tables under the main db user name. The term "synonym" as used herein refers to database synonyms, aliases or views that provide an access or link to the contents of the database. As will be appreciated by those skilled in the art, the ability to created or provide synonyms, aliases or views is a conventional feature in most commercial database systems. However, embodiments of the invention are not limited to such approaches, and other access or link features may be utilized.

Figure 5A:
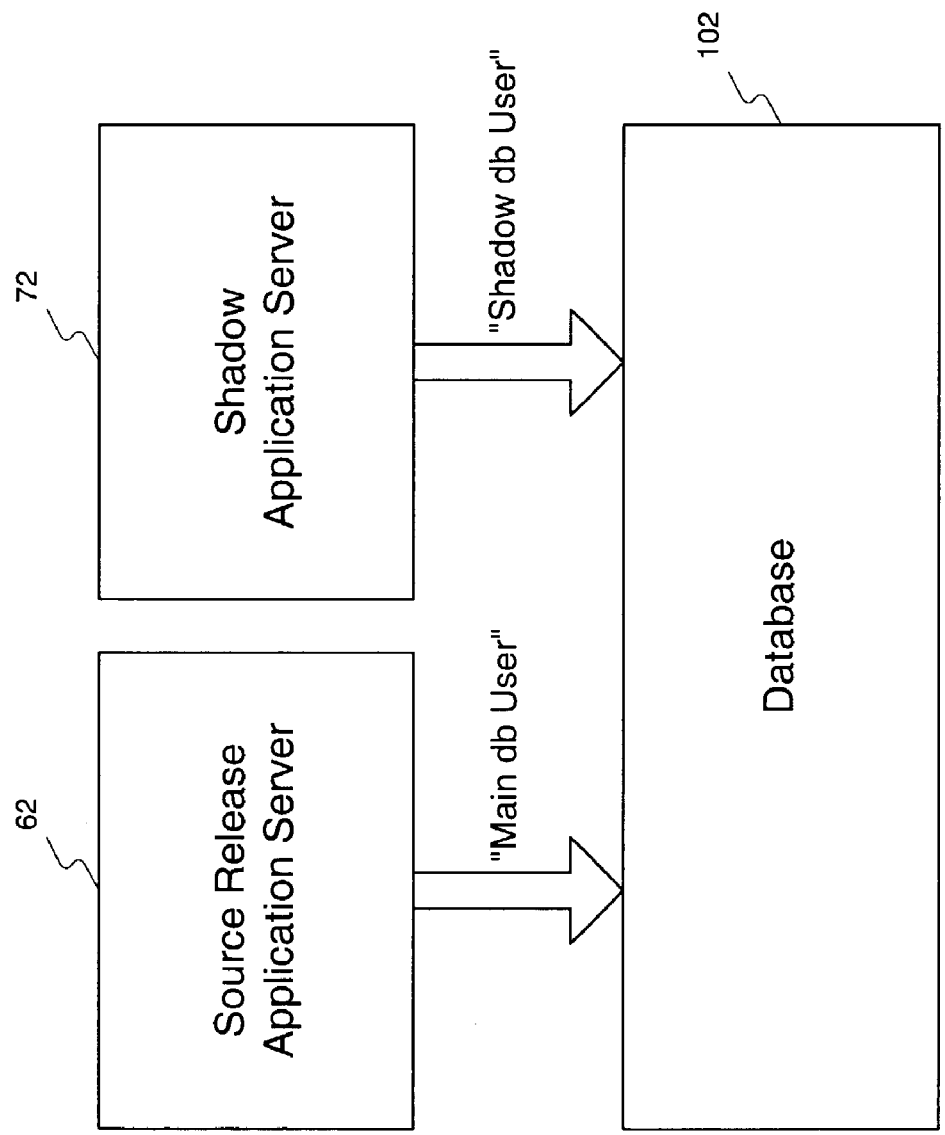
FIG. 5A is a block diagram of an exemplary system environment for performing a database upgrade using a source release or main application server and a shadow application server, consistent with embodiments of the present invention.
Figure 5B:
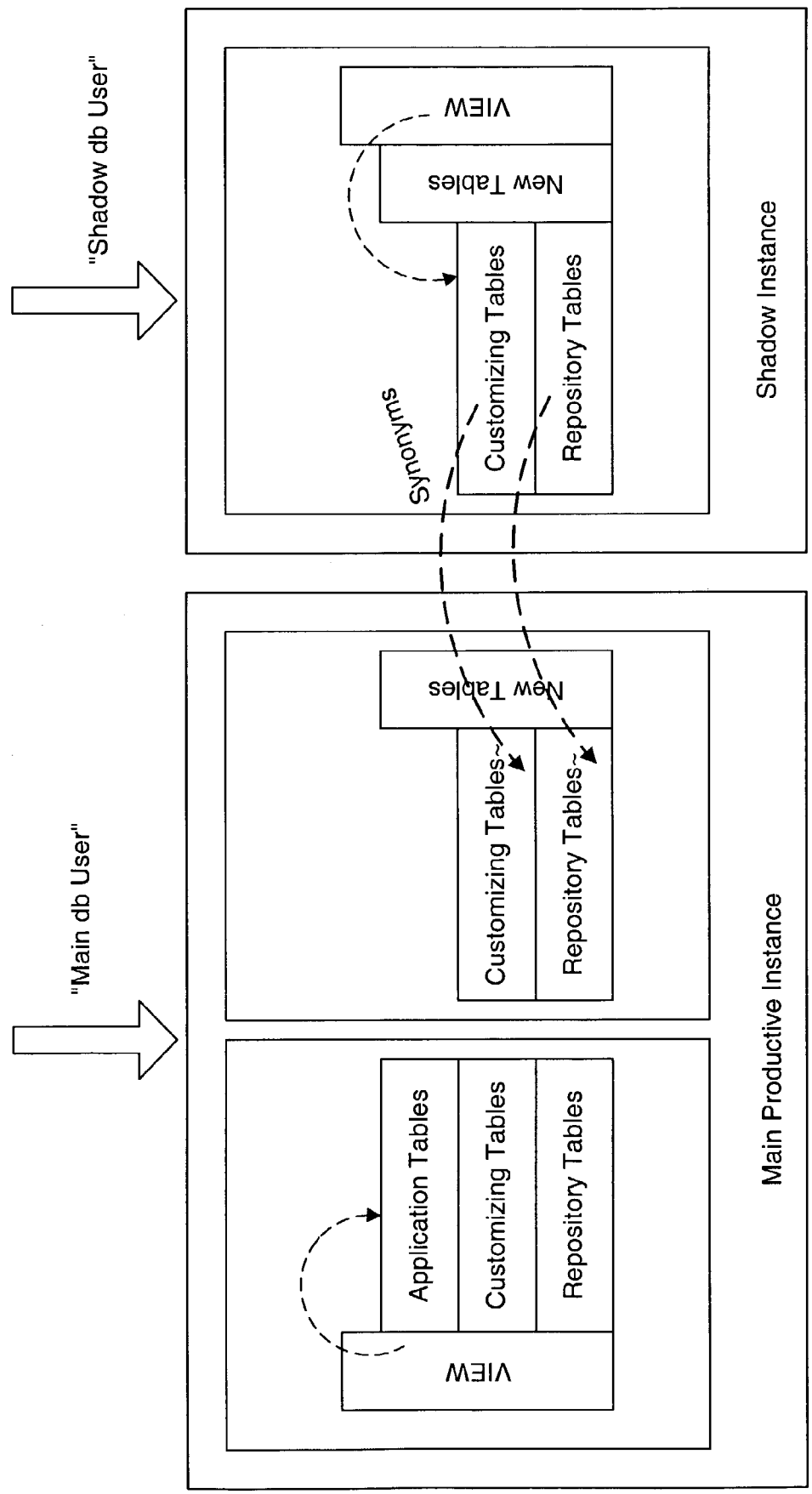
FIG. 5B is a block diagram of exemplary productive and shadow instances and the use of aliases, synonyms or views to provide a link for a shadow db user to access shadow tables stored under a main db user.

By way of example, if we assume a main db user (e.g., name: "sapr3") with access to the production system, then a suffix (such as "~") may be added to each main table name to create the shadow tables. For example, "tableA" in the main system may be specified by "sapr3.tableA" and the corresponding shadow system table may be designated as "sapr3.tableA~." Further, to permit parallel operation and access to the shadow tables by the shadow db user, synonyms may be created for the shadow db user that have names without the extension (e.g., "tableA") to access the shadow tables under the main db user. FIG. 5B, discussed further below, illustrates an example of this concept. As will be appreciated by those skilled in the art, other types of suffixes or naming conventions (such as the use of prefixes) may be utilized, so long as conflicts are avoided in the naming of tables or indexes in the database.

Referring again to FIG. 3, installation of the shadow system (step S.32) may include importing one or more applications of the destination release into the shadow system. The applications of the destination release may include new releases of programs provided by a software vendor. Data of the destination release may also be imported into the shadow system, such as new releases of data for configuring the programs. Additionally, a check of the source release on the main production system may be performed to copy user modified programs, add-ons, user specific data and/or other items. The source release may also be checked to identify and copy into the shadow system any applications not upgraded by the destination release.

In one embodiment, the shadow system is installed logically or physically in the same database as the main production system. Further, during installation of the shadow system, a main db user may access the database through, for example, a "main application server" connected to the database. The main application server may run an application server program (e.g., a set of kernel programs) and use a set of configuration files for the application server program that are associated with the source release. When installing the shadow system (step S.32; FIG. 3), a set of kernel programs and configuration files of the destination release may also be stored to provide a "shadow application server." Consistent with embodiments of the invention, the main application server and shadow application server may be implemented with, for example, a single server or workstation connected to the database. In such a case, the kernel programs and configurations files are stored in a different directories of the server memory or the database. Alternatively, separate servers or workstations may be provided (see, e.g., FIG. 5A), wherein each machine runs the appropriate kernel programs and configuration files, and connects to the database under a different database username (e.g., "main db user" or "shadow db user"). As will be appreciated by those skilled in the art, other server and database configurations are possible and, therefore, embodiments of the invention are not limited to the examples provided above.

After installing the shadow system in the database, the shadow system may be operated (step S.34). As part of this step, the shadow application server may be started by running, for example, the kernel programs and configuration files of the destination release. During operation of the shadow system, the shadow application server may connect to the database using the "shadow db user." As described above, synonyms may be used to permit the shadow db user to access the shadow tables or indexes installed under the main db user name. As a result, applications and data in the shadow system may be called by the shadow application server and the shadow db user may use access privileges (e.g., select, insert, update, delete, etc.) for adjusting the shadow system.

The operation of the shadow system (step S.34) may be performed in parallel with the runtime operation of the main system. Thus, certain preceding steps (such as step S.32) and following steps (such as steps S.36 and S.38) of FIG. 3 may be performed during runtime operation of the main system and before all systems need to be shutdown. This results in an overall reduction of the downtime required to complete the upgrade. Alternatively, in another embodiment of the invention, the shadow system may be operated independently of the main system (i.e., only during downtime of the main system). In such case, the required resources are minimized, but the required downtime will likely increase. Such a strategy may be useful if, for example, there are not sufficient resources for the shadow system to run in parallel or the user access requirements for the database environment are flexible enough to permit scheduling of a resources-minimized, upgrade strategy.

As further illustrated in FIG. 3, by running the shadow system, adjustments can be made to configure the shadow system (step S.36). For example, any conflicts arising from the destination release may be identified and corrected. This includes adjustments to the destination release structure based on user modifications, configurations, add-ons, customizing data and/or other items. Further, adjustments can be made to the shadow system structure based on any additional software or data installed in the shadow application server or destination release. Operation of the shadow system also permits testing of the destination release to confirm operability in the database environment before making the system switch from the source release to the destination release. As a result, system fault or disaster risks are minimized.

After configuring the shadow system, the shadow system is closed (step S.38). This step may be performed by stopping or exiting the shadow application server. In addition, if the main productive system is still running, then the main system may also be closed in order to place the database environment in a downtime mode.

During downtime, final updates to the shadow system may be performed (step S.40). For example, data in the shadow system for configuring program(s) may need to be restored by importing the data again from the destination release. Updates of this nature may be required in view of changes to data in the source release. Such changes may be made prior to the installation of the shadow system or during parallel operation of the main system and the shadow system. In one embodiment, triggers may be set-up to detect and report changes occurring on entries or data of the main production system. These triggers can then be analyzed during downtime to restore or update affected data in the shadow system back to the destination release (as needed). In one embodiment, different classes of data and priority schemes may be defined, including a class of user customized data which has priority over vendor defined or default data and a class of vendor defined or default data that has priority over any user customized data. Such data class definitions and priority schemes may vary from release to release. In either case, certain updates to data may need to follow the user customized data (present in the source release) or the vendor defined data (provided in the destination release). As a result, triggered entries can be updated in the shadow tables. For instance, certain default data for configuring program(s) may need to be imported again from the destination release into the shadow system.

As further illustrated in FIG. 3, a system switch is performed (step S.42). During the system switch, all applications and data related to the source release which have been upgraded are dropped. The corresponding applications and data in the shadow system are then renamed based on, for example, the original table or index names. For instance, in the previous example, the shadow table "sapr3.tableA~" would be renamed as "sapr3.tableA." Further, the main application server may be replaced by the shadow application server by switching or replacing, for example, the appropriate kernel programs and configuration files. This process can be performed physically or logically.

Optionally, after making the system switch, one or more post-processing operations may be performed (step S.44). For instance, additional table entries may be imported, such as entries that were not imported during the prior import to the shadow system. Further, any of the programs in the upgraded system may be executed to operate on imported data or application data. Logical adjustments may also be performed as part of post-processing to account for any new programs of the destination release.

Figure 4:
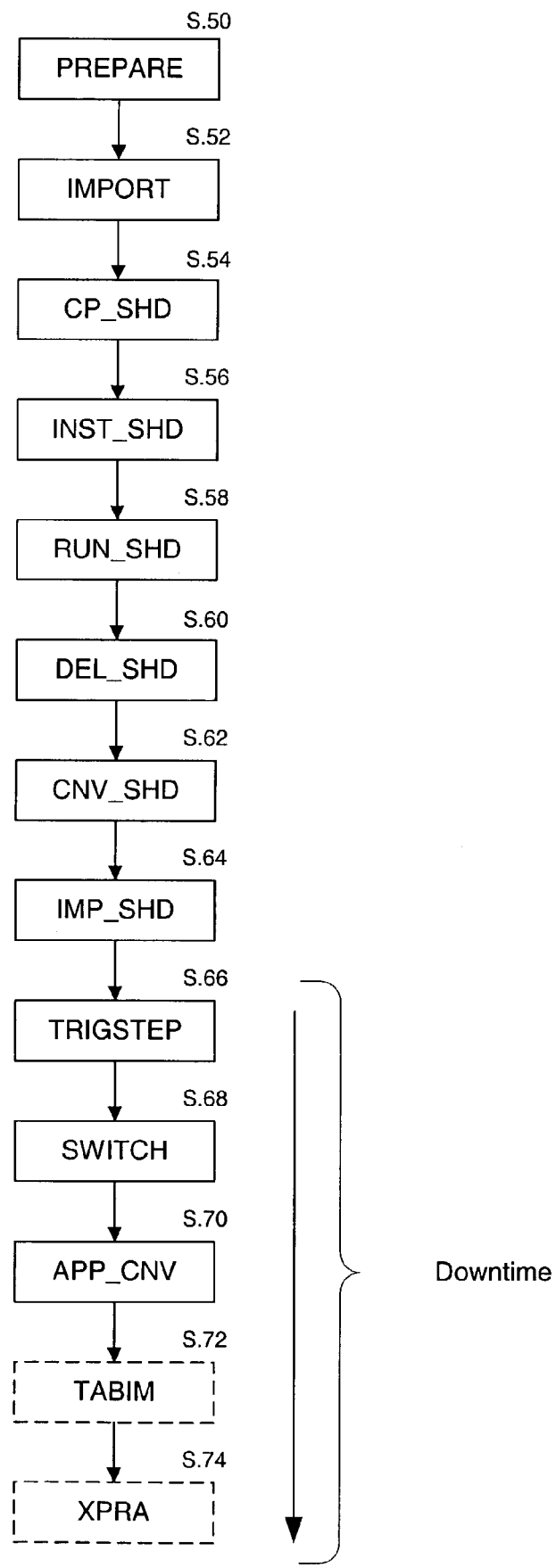
FIG. 4 is a flowchart of another exemplary method for performing a database upgrade, consistent with embodiments of the present invention.

FIG. 4 illustrates another exemplary method for upgrading a database, consistent with embodiments of the present invention. The embodiment of FIG. 4 will be described with reference to a database that comprises table structures for storing applications and data. In addition, the exemplary method is described in relation to a database environment in which access to the database by each database user is achieved through an application server. Although particular table structures and database arrangements are discussed below, it will be appreciated that embodiments of the invention are not limited to these examples and that the principles of FIG. 4, as well as that of the other disclosed embodiments, may be adapted or applied in other environments and combinations.

For purposes of illustration, assume that a database to be upgraded includes one or more "repository tables" which store programs, table structure definitions and data type definitions. Additionally, assume that the database stores data in the form of "customizing tables" and "application tables." Each customizing table may contain data to configure one or more programs, and each application table may contain application data that is generated during productive operation of one or more programs. All tables in the database may belong to at least one database user (e.g., a main db user). Further, prior to upgrading the database, the repository tables, customizing tables and application tables may be provided as part of a source release configuration in the main system (see, for example, FIG. 6A).

Entries in the repository tables and customizing tables may be developed and provided by, for example, a software vendor. However, entries in the application tables are generally created during productive operation of the applications and, therefore, no such data may be provided by a vendor. In one embodiment, entries in customizing tables that are provided by a vendor may be changed by a user or customer during configuration of the programs.

From time-to-time, the database may require updating in view of new release(s) of applications and/or data. In such a case, an upgrade of the database from a source release to a destination release may be performed. As illustrated in the exemplary embodiment of FIG. 4, one or more preparations may be performed for the upgrade (PREPARE; step S.50). For example, a system check may be performed to confirm that hardware and/or software requirements for the upgrade are satisfied. As part of this process, system checks may be performed to confirm that certain processing or database requirements are satisfied. Software requirements may also be analyzed, such as the requirement for specific editions or releases of operating system software and/or other applications. In one embodiment, a database user may be given the choice to select between a downtime-minimized strategy and a resource-minimized strategy for performing the upgrade. The downtime-minimized strategy may be selected when sufficient resources exist to operate the shadow system in parallel with the main production system. Alternatively, the resources-minimized strategy may be selected when, for example, sufficient resources do not exist for parallel operation. In which case, the shadow system and main production system are operated independently of one another (i.e., the shadow system is only operated during downtime of the main production system). As will be appreciated by those skilled in the art, the exemplary embodiment of FIG. 4 may be adjusted or modified according to the needs of the database environment and strategy that is selected for performing an upgrade. For purposes of illustration, however, the description provided below for FIG. 4 will assume that the upgrade is to be performed according to a downtime-minimized strategy.

As part of step S.50, preparations may be made for installing the shadow systems. For instance, consistent with embodiments of the invention, the shadow system may be installed logically or physically in the same database as the main production system. By way of example, assume a database environment is provided such as that illustrated in FIG. 5A. Table entries for both the source release and the destination release (shadow system) may be stored in a database 102. A "main db user" may access the source release tables in database 102 through a source release or main application server 62. Main application server 62 may run an application server program (e.g., a set of kernel programs) and one or more configuration files associated with the source release. When installing the shadow system (step S.50; FIG. 4), the kernel programs and configuration files of the destination release may also be stored to create a shadow application server 72. During operation of the shadow system, shadow application server 72 may provide access to the destination release tables in database 102 for a "shadow db user."

In one embodiment, main application server 62 and shadow application server 72 may be implemented with, for example, a single server, workstation or computing device connected to database 102. In such a case, the kernel programs and configurations files of the destination release may be stored in a different directory than that of the source release. Alternatively, as illustrated in FIG. 5A, separate servers or workstations may be provided to implement servers 62 and 72. In accordance with this embodiment, separate machines may advantageously used for the applications servers in order to reduce the processing loads and other resource requirements that would otherwise be required by a single machine running both application servers.

The shadow application server should be configured in such a way that the main application server is not affected. If a single machine or server with ports is used to implement the shadow and main application servers, the numbers used by the shadow application server should differ from the ports used by the main application server. Conflicts should also be avoided for other kinds of operating system resources depending on the database environment.

Preparation for the shadow system (step S.50) may also include defining and creating the storage structures for the shadow system. Assume, once again, that table structures are used in the database. In such a case, DDL statements or other conventional techniques may be utilized for defining and creating the required database tables for the shadow system. To prepare for the installation of the shadow tables, the repository tables and customizing tables of the destination release may be created in the database. In one embodiment, naming conventions for the shadow system may be similar to that used for the tables of the source release. However, to avoid conflicts and permit parallel operation of the main production system and shadow system, unique table names for the shadow tables are required. By way of example, a suffix may be used to create unique names for the shadow tables under the main db user. Assume, for example, that each table is qualified by specifying: "database user name"."table name." If a main system table is called "main_db_user.BASIS~" then the corresponding table in the shadow system could be called "main_db_user.BASIS~". In this example, it is assumed that the main production system does not include any tables with a name containing the suffix "~". As will be appreciated by those skilled in the art, other suffixes or naming conventions may be implemented, consistent with the present invention. By way of example, a prefix (such as "$") may be used to create unique names for the shadow tables.

Figures 6A, 6B:
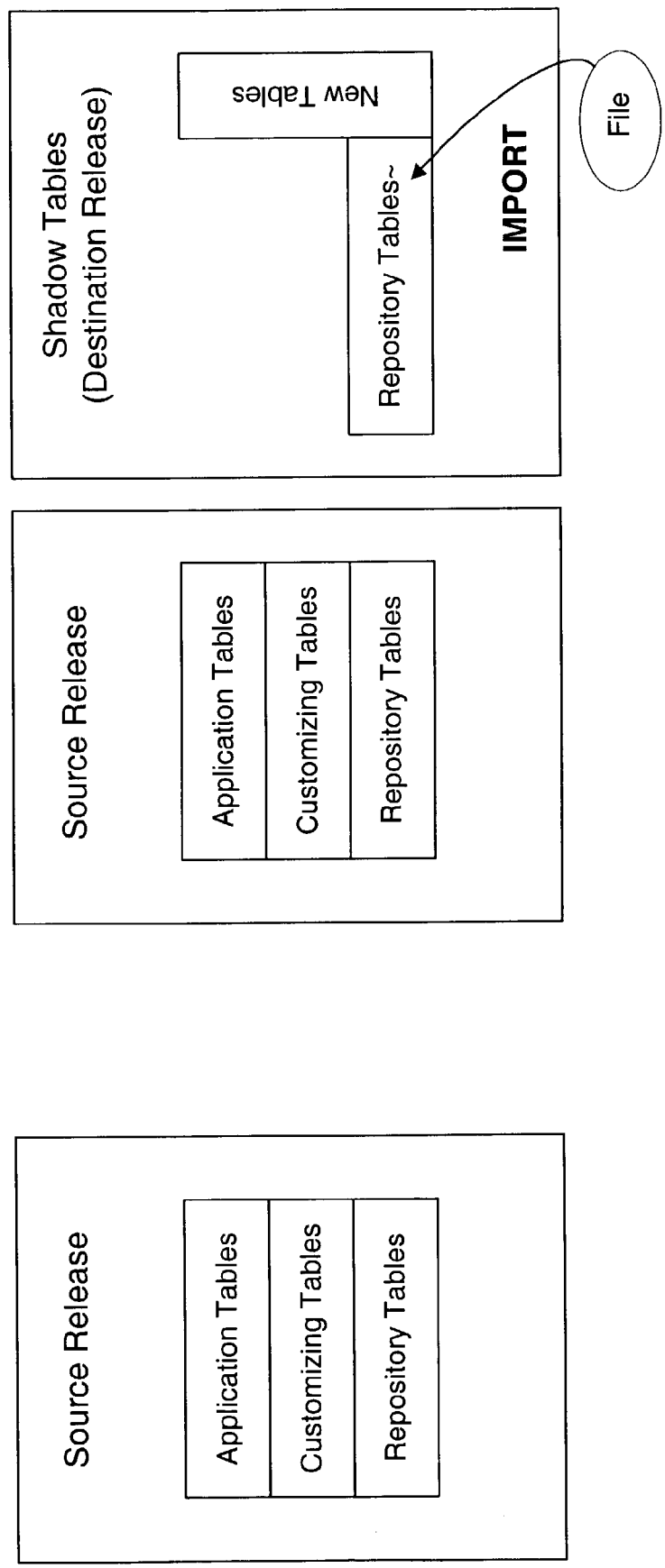
FIGS. 6A-6H illustrate exemplary source and destination release tables associated with performing a method for upgrading a database, consistent with embodiments of the present invention.

Referring again to FIG. 4, installation of the shadow system may be performed by importing the applications and/or data of the destination release into the shadow tables (IMPORT; step S.52). For example, as illustrated in FIG. 6B, programs, table structure definitions and/or data type definitions for the repository tables may be imported from a file into the shadow system. The applications of the destination release may include new releases of programs provided by a software vendor. Additionally, although not shown in FIG. 6B, data associated with the destination release may also be imported into the shadow system at this time. For instance, data for configuring the programs may be imported into the customizing tables of the shadow system.

Optionally, as part of step S.50 or S.52, the development area of the main application server may be locked. This operation may be performed to prevent any new programs from being installed to the main system after this step. Additionally, the locking of the development area may prevent any new programs changes from being copied to the shadow system. While the development area of the main system may be locked, general runtime access and operation of the main system may continue, including when the shadow system is operated in parallel by a shadow db user.

Figure 6D:
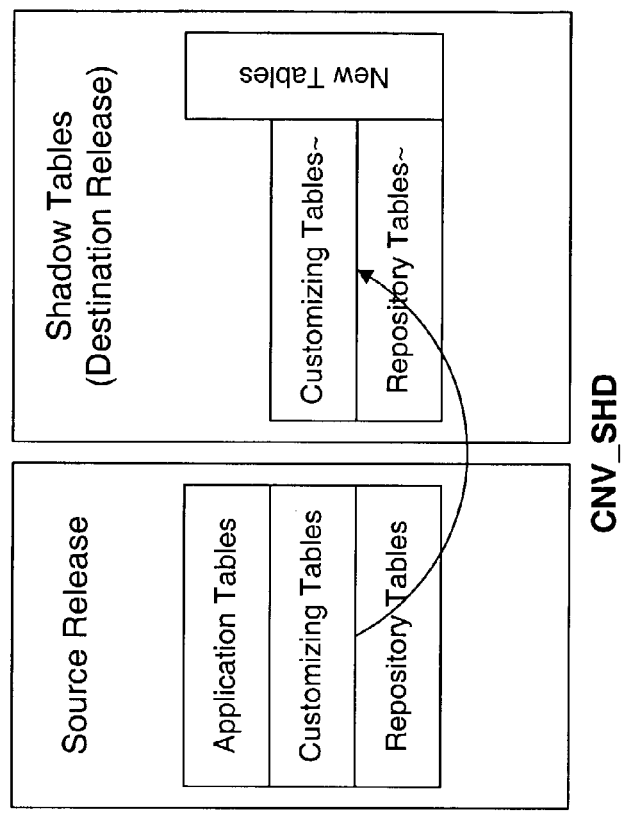
Figure 6C:
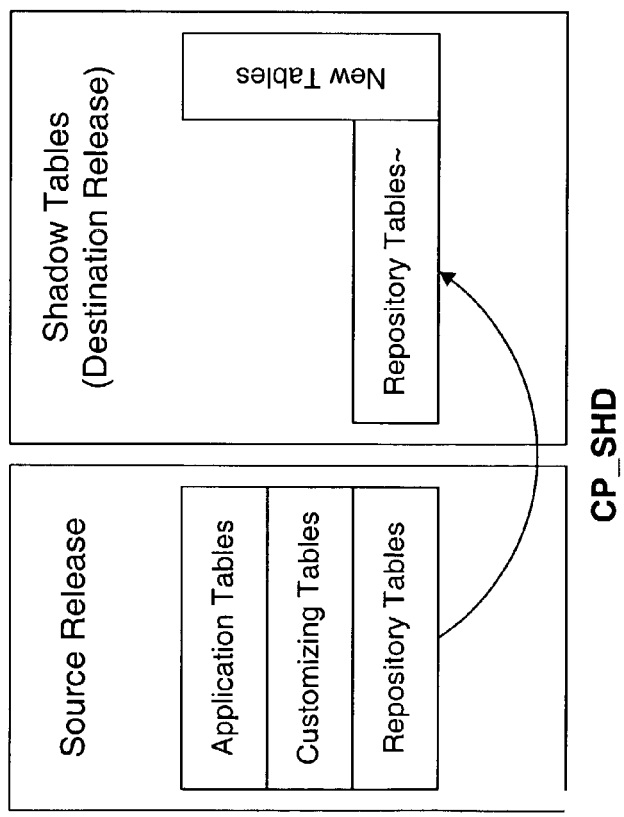

Consistent with embodiment of the invention, customer modifications to programs in the source release may be analyzed and copied to the shadow system (CP_SHD; step S.54). In this regard, an analysis of the repository tables of the main system may be performed to identify programs of the source release that have been modified by the user or that have been modified by the user's own applications. Any user modified programs may be copied from the repository tables of the main system to the repository tables of the shadow system. By way of example, this procedure is illustrated in FIG. 6C.

Optionally, as part of step S.54, any additional applications installed in the source release may be identified and copied to the destination release or shadow repository. For example, add-ons or other programs may be copied from the repository tables of the main system to the repository tables of the shadow system. Generally, these additional programs correspond to programs that are not imported as part of the destination release (see step S.52) and will not be upgraded together with the main system.

Installation of the shadow system may be completed by, for example, creating synonyms and granting privileges to the shadow db user (INST_SHD; step S.56). As indicated above, shadow tables may be created under the name of the main db user. To permit parallel operation and access to the shadow tables by the shadow db user, synonyms may be created for the shadow db user that have names without the extension (e.g., "tableA"). In one embodiment, DDL statements are used to create synonyms for the tables in the shadow system. Such synonyms may be used by the shadow db user to access the shadow tables installed under the main db user. FIG. 5B illustrates an example of this concept. In FIG. 5B, a shadow db user may view tables in the shadow system by calling synonyms. The term "synonym" as used herein refers not only to database synonyms, but also aliases or views that provide an access or link to the contents of the database. By calling a synonym name (e.g., "tableA"), an access or link is made to the corresponding table in the shadow system that was installed under the name of the main db user (e.g., "main_db_user.tableA~"). As will be appreciated by those skilled in the art, the ability to provide synonyms, aliases or views is a conventional feature in most commercial database systems. However, embodiments of the invention are not limited to such approaches, and other access or link features may be utilized depending on the nature of the database environment.

In addition to creating synonyms, various access privileges may be granted to the shadow db user. Such privileges may include the right to, for example, select, insert, update and/or delete the shadow tables. In addition, DB catalogue select access may be provided for the shadow tables installed under the main db user name. As part of step S.56, all non-data containing DB objects that are needed for the shadow application server may also be created. Such objects may include, for example, Views, Sequences, Triggers, Aliases/Synonyms, as well as other non-data containing DB objects. This process may be performed by connecting to the database as the shadow db user and executing the statement for the original named object. Views, Sequences, Triggers and other objects may refer to the synonyms instead of the full table name under the main db user. Finally, any stored procedures that need to run the shadow application server may be imported as part of step S.56.

After installing the shadow system in the database, the shadow system may be operated (RUN_SHD; step S.58). As part of this step, the shadow application server may be started by running, for example, the kernel programs and configuration files of the destination release. During operation of the shadow system, the shadow application server may connect to the database using the "shadow db user" (see, e.g., FIGS. 5A and 5B). With the shadow application server running in parallel to the main application server, programs in the shadow system may be called that are stored in the shadow repository tables and configured by the data in the shadow customizing tables. Adjustments can then be made to the destination release of the shadow system according to any user or customer modifications.

In one embodiment, the shadow application server is used to adjust customer modifications to the destination release. For example, the shadow application server can be used to run programs to compute the destination release structure of tables including customer modifications, configurations and additional software installed such as support packages. Additionally, or alternatively, DDL statements may be created for any new tables, and other DDL statements may be created to adjust existing tables to the new structure.

As stated above, the shadow application server may be used to operate on the destination release while the source release is still in productive use in the main system. Applications and/or data of the destination release may be pre-configured. Further, since the shadow application server does not have access to any source release tables of the main application server, no changes or damage can be done to productive data in the main system.

Other procedures may be performed during parallel operation of the shadow system and main production system. For example, a calculate DDL alter statements procedure may be performed to calculate the DDL statements for modifying or altering the main application tables to adapt the structure of the destination release. This procedure may be performed by accessing the DB table catalogue and identifying the table definition of the main db user (i.e., not the shadow db user).

If the calculate DDL alter statements procedure is executed during runtime of the main system, then the main application server should be locked beforehand to prevent against any table structure changes. If, however, the calculate DDL alter statements is performed at the beginning of downtime, the main application server does not need to be locked against table structure changes. As a result, the table content may be changed during runtime.

Additional procedures may be performed using the shadow application server. For example, DDL statements to create the "shadow customizing tables" may be calculated, including DDL statements for any modifications and changes by additionally installed software. Moreover, a determine conversions procedure may be performed to determine the application tables that need to be converted. The new structure can only be realized, if a new table is created, and all the data is copied, converting the field entries to the new structure. Further, a calculate DDL drop/create statements procedure may be executed to calculate the DDL statements to recreate objects that refer to tables that are switched, even if they do not change from the source release to the destination release. These dependent objects may get lost during the switch of the tables on some databases. By way of example, as part of this procedure, DDL drop/create statements may be created for views on the repository and customizing tables.

After operating the shadow system and making adjustments, elements of the shadow system may be removed or deleted (DEL_SHD; step S.60). First, operation of the shadow application server may be stopped and all non-data containing DB objects (e.g., Views, Sequences, etc.) may be dropped. In addition, the synonyms created for the shadow db user to access the shadow tables may be dropped and all granted privileges (select, insert, update, etc.) revoked. Optionally, if any application tables have been determined to be in need of conversion during the determine conversions procedure, then incremental conversions of the application tables may be performed at this time. Incremental conversions may only be rewarding if the table(s) to be converted have a lot of entries.

During step S.60, the shadow customizing tables may be dropped and replaced with shadow customizing tables with the final destination release structure. Additionally, new application tables may be created for any application tables that did not exist in the source release. Such tables may be created using the full or correct name under the main db user (e.g., without a suffix such as "~").

Before downtime, triggers may be created on the main customizing tables to report any change in the customizing table content. Such changes may have occurred prior to the installation of the shadow system or during the upgrade. The use triggers or other database tracking mechanisms may be useful for handling, for example, priority schemes between different classes of data. For instance, in certain database environments, user modifications to one class of data entries in the customizing tables may have priority over any vendor defined or default entries. Likewise, another class of data entries may give priority to vendor defined or default data over any user modifications. Further, predefined priority schemes may require that certain data be overwritten or restored (e.g., to vendor defined data in the destination release) when performing an upgrade. Such data class definitions and priority schemes may change from entry to entry, as well as from release to release.

Various trigger strategies may be employed. For instance, in one embodiment, triggers on the main customizing tables may record any updates and also cause adjustments to the content of the shadow customizing tables based on the update to the main customizing tables. For example, if an entry in table "A" of the main customizing tables has been inserted, updated or deleted, then the trigger may cause the corresponding entry in table "A~" of the shadow customizing tables to be inserted, updated or deleted. The update to the shadow customizing tables may be performed automatically for all changes to the main customizing tables. In such a case, the priority schemes will need to be resolved during downtime. However, to avoid later restoring or adjusting the data, updates to the shadow customizing tables may be contingent on the priority scheme for the affected entry. Thus, for example, only certain user modifications may be passed through to overwrite entries in the shadow customizing tables. Alternatively, in another embodiment, triggers on the main customizing tables may only report updates on the main customizing tables. In this case, updates to the shadow tables and analysis of the appropriate priority scheme will be required during downtime.

Figure 6E:
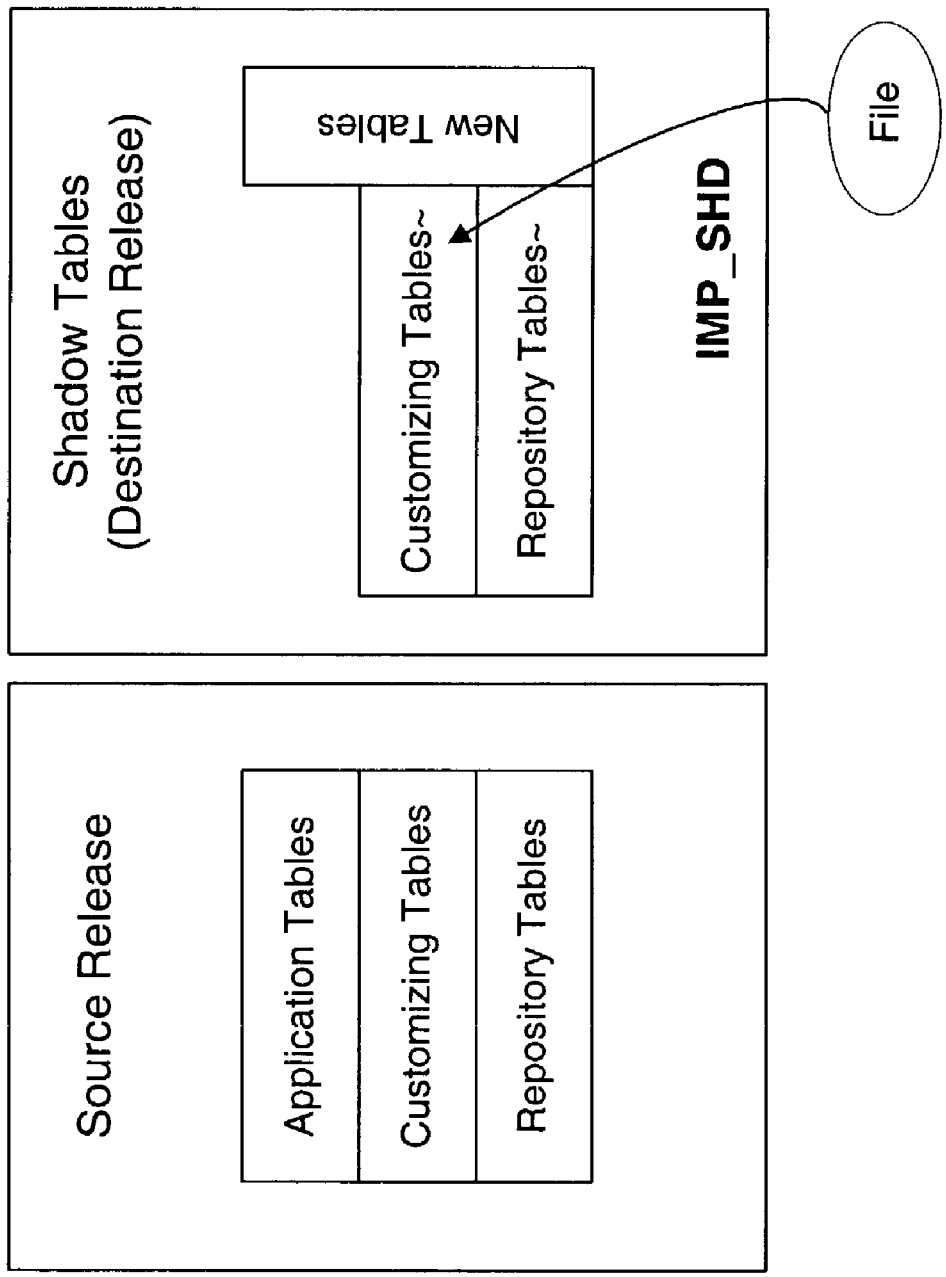

Referring again to FIG. 4, conversion of the customizing data may be performed before entering downtime (CN-V_SHD; step S.62). For instance, data from the main customizing tables may be copied to the shadow customizing tables. This is conceptually shown in the exemplary block diagram of FIG. 6D. As part of this procedure, the copying program should adapt the table's content to any field type changes. Thereafter, any customizing data in the destination release may be imported into the shadow customizing table (IMP_SHD; step S.64). As part of this process, each customizing data entry that has been upgraded or provided in the destination release may be imported from memory or a file into the shadow customizing tables. The exemplary block diagram of FIG. 6E illustrates this process. Consistent with embodiments of the invention, any number of data entries may be upgraded in the destination release and, as a result, the import to the shadow customizing tables may affect any number of entries copied from the main customizing tables.

To perform the system switch and complete the upgrade, productive operation of the main system may be stopped by shutting down the main application server. In addition, all triggers on the main customizing tables may be dropped. Then, any necessary adjustments to the customizing data may be performed by analyzing the trigger reports (TRIGSTEP; step S.66). If a trigger strategy was implemented in which only a report of table content changes was made, then the trigger results may be analyzed to adjust the shadow customizing tables. For instance, tables where a trigger reported a change in entries should be copied again from the main customizing table to the shadow customizing table. If priority schemes exist, then each entry where a change was reported should be analyzed to determine, for example, whether the entry should be overwritten with data from the destination release or whether the user modification has priority. This later step should also be performed for trigger strategies in which all updates were automatically made to the shadow customizing tables without any analysis of the applicable priority schemes. In cases where the vendor defined data or default data has priority, the destination release customizing data may need to be again imported into the shadow tables where the trigger reported a change in the entries.

Figure 6G:
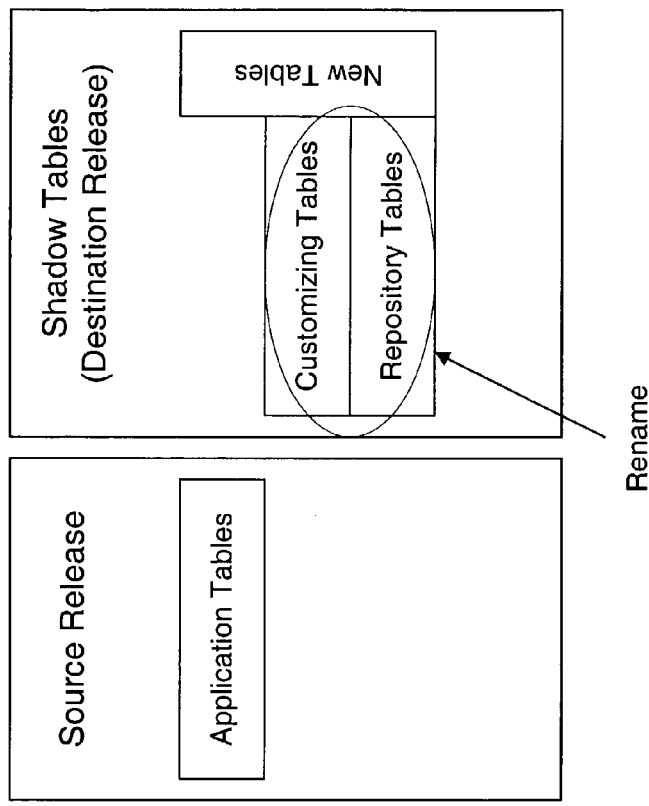
Figure 6F:
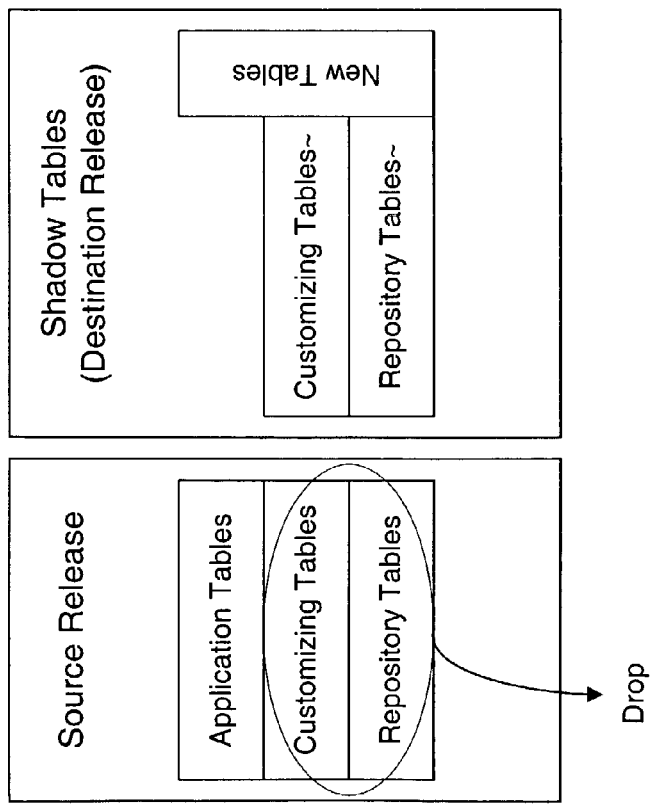

Following any final adjustments to the shadow system, a system switch may be performed (SWITCH; step S.68). To make the system switch from the source release to the destination release, the repository tables and customizing tables of the main system may be dropped (see, e.g., FIG. 6F). Further, the repository tables and customizing tables may be renamed to their to the original names (see, e.g., FIG. 6G). For example, a repository table in the shadow system named "main_db_user.BASIS~" would be renamed to its original name "main_db_user.BASIS". Similar renaming may be performed on other repository and customizing tables in the shadow system.

During the system switch, executables for the main application server may also be switched or replaced. For instance, the main kernel programs may be replaced by the kernel programs of the destination release, and the configuration files of the main system may be replaced or adapted to the destination release features. This step may be omitted if the destination release application server shall run with the configuration of the shadow application server (e.g., with the different ports, and other changes in configuration for this server). Additionally, as part of this procedure, all stored procedures needed by the application server may be replaced or imported to be consistent with the destination release. Any updated version of the procedures will be needed upon start of the system. Further, if the calculate DDL drop/create statements procedure was performed, then the DDL statements computed by this procedure may be executed at this time.

Figure 6H:
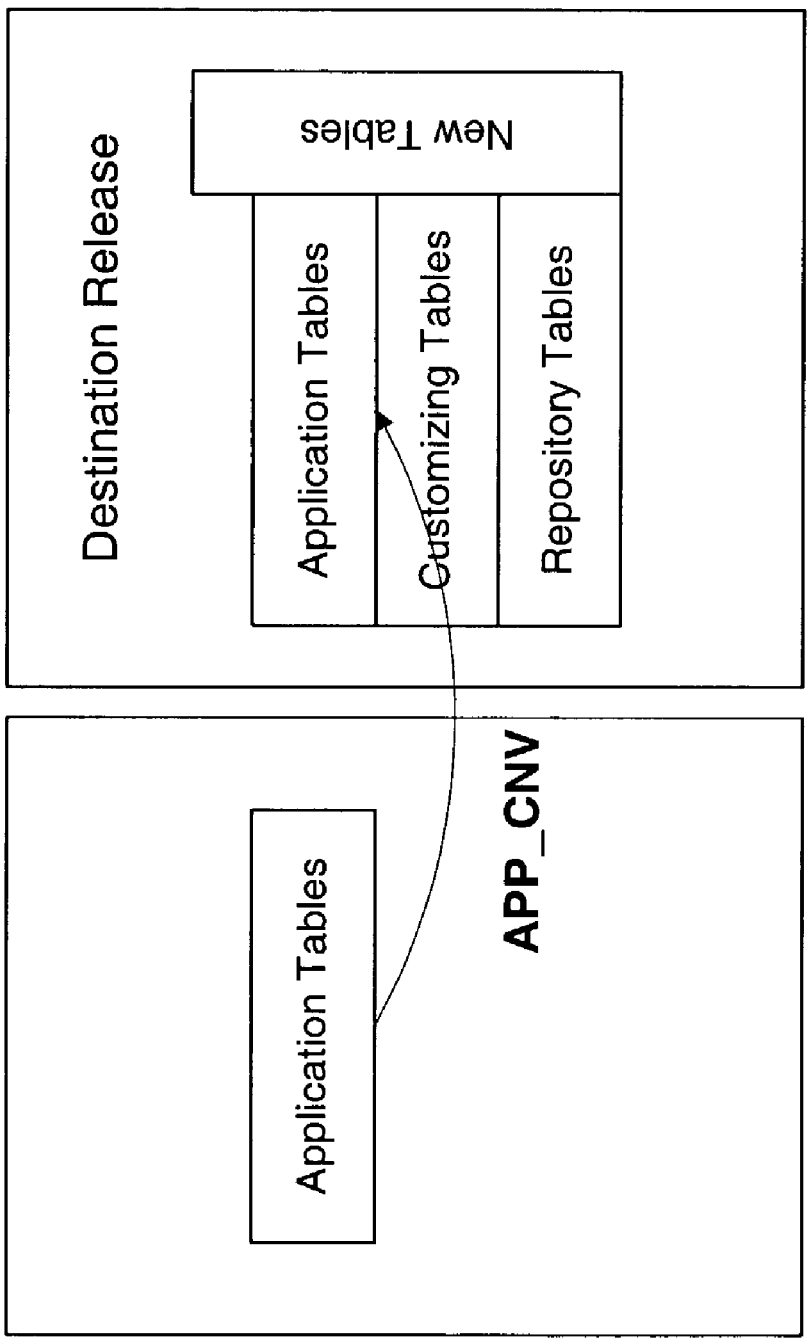

Before operating the destination release, the application tables may be adjusted (APP_CNV; step S.70). For example, the main application tables may be adjusted to the destination release structure (see, e.g., FIG. 6H). As part of this process, the statements calculated during the calculate DDL alter statements procedure may be utilized if the application table structure did not change since the operation of that procedure. Additionally, as part of step S.70, adjustments may be made to the DB objects (e.g., Views, Triggers, Synonyms, etc.) that have changed from source release to the destination release.

Optionally, after making the system switch, one or more post-processing operations may be performed. For instance, additional table entries may be imported (TABIM; step S.72), such as entries in the customizing tables that were not imported during the prior import to the shadow system. Further, any of the programs in the upgraded system may be executed to operate on the imported data . Additionally, or alternatively, application data adaptation reports may be generated or logical adjustments may be performed as part of the post-processing to account for new programs of the destination release (XPRA; step S.74). For instance, any kind of program may be operated on application data and adjusted to the new programs. Logical adjustments or structural adaptations can be made based on the "adjust application tables" procedure.

After completing the upgrade, the main application server may be started again. The application server is now on the destination release and is ready for productive operation again.

The embodiment of FIG. 4 may be modified or adjusted in any manner, including to delete, substitute or reorder any of the above-described steps in the exemplary method. For instance, FIG. 4 may be implemented without the use of any triggers. In such a case, no shadow customizing table is created and the triggers on the main customizing tables can be omitted. Instead, the customizing data should be imported during downtime, and after adaptations to the structure. This may be faster or more efficient if there are a lot of entries in these tables and the number of new entries is limited. Moreover, in the embodiment of FIG. 4, the steps of dropping/creating shadow customizing tables, creating triggers, copying and importing to the shadow system, dropping triggers, and evaluating of the trigger results and repeating the copying and importing to the shadow system can be omitted. Additionally, if triggers are deleted from the upgrade process, at least the import of the entries to new tables can be performed during runtime. In this case, the step of importing to shadow system needs to be run.

Figure 7:
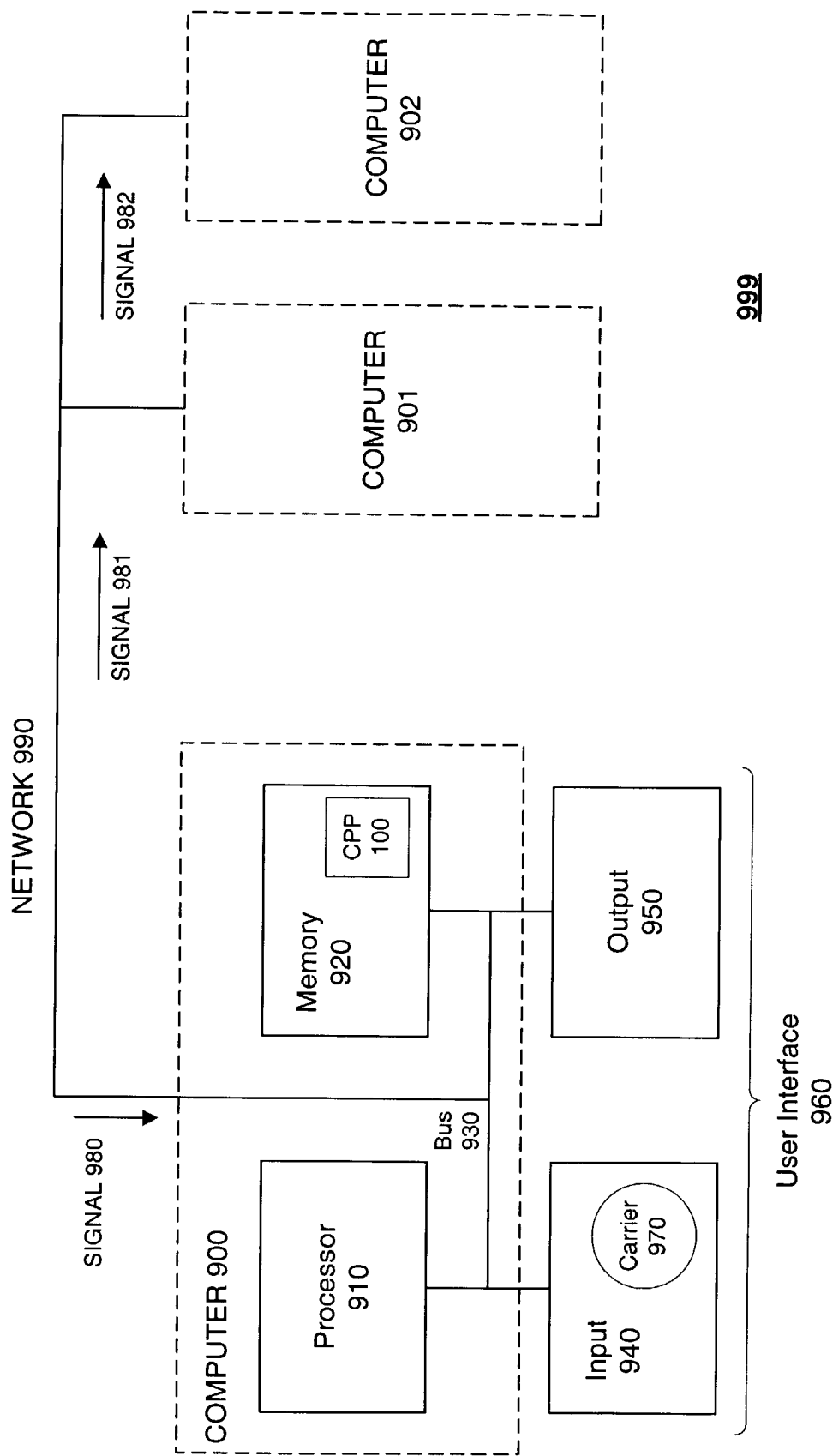
FIG. 7 is an exemplary system environment in which embodiments of the present invention may be implemented.

FIG. 7 illustrates an exemplary system environment 999 in which certain embodiments of the invention may be implemented, including the embodiments of FIGS. 1-4. In FIG. 7, system environment 999 is configured as a computer network system including a plurality of computers 900, 901, 902 (or 90$q$, with q=0 ... Q-1, Q any number). Computers 900-90$q$ are coupled via inter-computer network 990. Computer 900 comprises a processor 910, a memory or database 920, a bus 930 and, optionally, an input device 940 and an output device 950 (I/O devices or user interface 960). As will be appreciated by those skilled in the art, embodiments of the invention and associated functionality may be implemented by a computer program product 100 (CPP), a program carrier 970 and/or a program signal 980, collectively "program."

With respect to computer 900, computer 901/902 may be referred to as a "remote computer." Computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional personal computer (PC), a desktop, a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), a digital signal processor (DSP), or the like.

Memory or database 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Optionally, memory 920 is distributed across different media. Portions of memory 920 can be removable or non-removable. For reading from media and for writing to media, computer 900 uses devices well known in the art such as, for example, disk drives, tape drives and the like.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and, optionally, data that cause processor 910 to execute methods consistent with embodiments of the present invention, including the exemplary methods disclosed herein. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer-readable medium, such as a medium largely explained above (cf. memory 920). Generally, carrier 970 is an article of manufacture comprising a computer-readable medium having computer-readable program code means embodied therein for executing methods and systems consistent with embodiments of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner, disk drive. Although the examples are devices operated with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor, a display, a cathode ray tube (CRT), a flat panel display, a liquid crystal display (LCD), a speaker, a printer, a plotter, or a vibration alert device. Similar as above, output device 950 communicates with the user, but it can also communicate with other computers.

Input device 940 and output device 950 can be combined into a single device; or either device 940 or device 950 can be provided optionally.

Bus 930 and network 990 provide logical and physical connections by conveying instruction and data signals. While connections inside computer 900 are conveniently referred to as "bus 930", connections between computers 900-902 are referred to as "network 990". Optionally, network 990 comprises gateways, such as computers that specialize in data transmission and protocol conversion.

Devices 940 and 950 are coupled to computer 900 by bus 930 (as illustrated) or by network 990 (optional). While the signals inside computer 900 are mostly electrical signals, the signals in network may be electrical, magnetic, optical or wireless (radio) signals.

Networking environments (such as network 990) are commonplace in offices, enterprise-wide computer networks, intranets and the Internet (i.e., the World Wide Web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN), an Integrated Services Digital Network (ISDN), an infra-red (IR) link, a radio link, such as a Universal Mobile Telecommunications System (UMTS), Global System for Mobile Communication (GSM), Code Division Multiple Access (CDMA), or a satellite link.

Transmission protocols and data formats are known, for example, as transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. It is intended, therefore, that the specification and examples be considered as exemplary only, with a true scope and spirit of the invention being indicated by the following claims and their full scope of equivalents.

What is claimed is:

1. A method for upgrading a database, the database including a main system with a source release accessible to a main database user, the method comprising:
   installing in the database a shadow system that includes a destination release accessible to a shadow database user, wherein installing the shadow system comprises defining storage structures for the destination release based on a name of the main database user, and creating synonyms for the shadow database user to provide access to storage structures for the destination release that are stored under the name of the main database user;
   operating the shadow system in parallel with operation of the main system;
   setting a plurality of triggers to detect and report chances in data in the main production system:
   analyzing the triggers, during downtime of the main system, to restore or update the changed data in the shadow system back to the destination release: and
   performing, during downtime of the main system, a system switch to remove the source release from the database and provide an upgraded system based on the destination release of the shadow system.

2. A method for upgrading a database according to claim 1, wherein installing the shadow system further comprises importing at least one of a software application and data of the destination release into the defined storage structures.

3. A method for upgrading a database according to claim 1, wherein defining the storage structures comprises adding a predetermined suffix to a defined name of each storage structure in the shadow system.

4. A method for upgrading a database according to claim 1, wherein the storage structures for the destination release comprise tables, and further wherein the tables comprise repository tables, customizing tables and application tables.

5. A method for upgrading a database according to claim 1, further comprising configuring the shadow system installed in the database during runtime operation of the main system.

6. A method for upgrading a database according to claim 5, wherein configuring the shadow system comprises adjusting entries of storage structures for the destination release based on at least one of user modifications, configurations and additional software.

7. A method for upgrading a database according to claim 1, wherein, prior to the system switch, the shadow system is installed physically in the same database as the main system.

8. A method for upgrading a database according to claim 1, wherein
   the destination release includes destination information comprising a destination information name;
   the main system includes main system information comprising a main system information name; and
   the destination information name and the main system information name are different.

9. A method for upgrading a database according to claim 1, wherein the shadow system is updated before the system switch and during downtime of the main system.

10. A method for upgrading a database according to claim 1, wherein the shadow system is updated before the system switch and during downtime of the main system, wherein the main system is run on a main system application server, the shadow system is run on a shadow system application server, and the application servers are implemented on one device.

11. A method for upgrading a database according to claim 1, further comprising:
    determining whether the destination release is compatible with hardware and software associated with the database,
    wherein the shadow system is installed if the destination release is compatible.

12. A method for upgrading a database according to claim 1, wherein the main system is operated during an operating period, and the destination release includes data that was no present on the main system during the operating period.

13. A system for upgrading a database, the database including a source release accessible to a main database user, the system comprising:
    means for installing in the database a shadow repository that includes a destination release accessible to a shadow database user, the means for installing comprising means for defining storage structures for the destination release based on a name of the main database user, and means for creating synonyms for the shadow database user to provide access to storage structures for the destination release;

means for providing access to the shadow repository in parallel with access to the source release;

means for setting a plurality of triggers to detect and report changes in data in the source release;

means for analyzing the triggers, during downtime of the main system, to restore or update the chanced data in the shadow repository back to the destination release; and means for performing, during downtime of access to the source release, a system switch to replace the source release in the database with the destination release of the shadow repository.

14. A system for upgrading a database according to claim 13, wherein the means for installing the shadow repository further comprises importing at least one of a software application and data of the destination release into the defined storage structures.

15. A system for upgrading a database according to claim 13, wherein the means for defining the storage structures for the destination release comprises adding a predetermined suffix to a defined name of each storage structure in the shadow repository.

16. A system for upgrading a database according to claim 13, wherein the storage structures for the destination release comprise tables, and further wherein the destination release tables comprise repository tables, customizing tables and application tables.

17. A system for upgrading a database according to claim 13, further comprising means for configuring the shadow repository installed in the database during runtime access to the source release.

18. A system for upgrading a database according to claim 17, wherein the means for configuring the shadow repository comprises adjusting entries of storage structures for the destination release based on at least one of user modifications 19. A computer-readable medium that stores program instructions that are executable by a computing-based environment to perform a method for upgrading a database, the database including a main productive system with a source release accessible to a main database user, the source release comprising a plurality of software applications and associated data, the method comprising:

installing in the database a shadow system that includes a destination release accessible to a shadow database user, the destination release comprising at least one new release of a software application or data, wherein installing the shadow system comprises defining storage structures for the destination release based on a name of the main database user, and creating synonyms for the shadow database user to provide access to storage structures for the destination release;

operating the shadow system in parallel with operation of the main productive system;

setting a plurality of triggers to detect and report changes in data in the main productive system;

analyzing the triggers, during downtime of the main productive system, to restore or update the changed data in the shadow system back to the destination release; and performing, during downtime of the main productive system, a system switch to remove the source release from the database and provide an upgraded system based on the destination release of the shadow system.

20. A computer-readable medium according to claim 19, wherein installing the shadow system further comprises importing the at least one of software application of the destination release into the defined storage structures.

21. A computer-readable medium according to claim 19, wherein defining the storage structures comprises adding a predetermined suffix to a defined name of each storage structure in the shadow system.

22. A computer-readable medium according to claim 19, wherein the storage structures for the destination release comprise tables, and further wherein the destination release tables comprise repository tables, customizing tables and application tables.

23. A computer-readable medium according to claim 19, further comprising configuring the shadow system installed in the database during runtime operation of the main productive system.

24. A computer-readable medium according to claim 23, wherein configuring the shadow system comprises adjusting entries of storage structures for the destination release based on at least one of user modifications, configurations and additional software.

* * * * *